Patented Jan. 2, 1945

2,366,221

UNITED STATES PATENT OFFICE 2,366,221

5-SUBSTITUTED-5-(2-THIENYL) HYDANTOINS

James J. Spurlock, Denton, Tex.

No Drawing. Application March 13, 1942, Serial No. 434,585

10 Claims. (Cl. 260—309.5)

This invention relates to 5-substituted-5-(2-thienyl) hydantoins.

Various compositions have been proposed as anticonvulsants for the treatment of epilepsy and related ailments. Some of these compositions are sedatives and must be used with extreme care, since they seriously restrict the performance of the duties of the patient in the workaday world and in case of sudden discontinuance of the treatment severe seizures or even status epilepticus is quite apt to follow. Consequently the ideal anticonvulsant is one which possesses substantially no sedative properties. Another extremely desirable property of an anticonvulsant is low toxicity; for the anticonvulsant to be effective must be administered daily and a composition with a high toxicity might well result in dire consequences.

In accordance with this invention new compositions are utilized which have marked anticonvulsive activity, which manifest substantially no hypnotic or sedative effect, and which possess extremely low toxicity.

The compositions of this invention may be represented by the following formula:

(1) 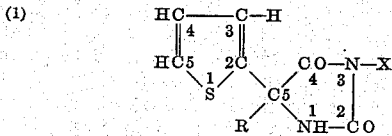

in which R represents a hydrocarbon radical, preferably a hydrocarbon radical having less than 9 carbon atoms, and X represents a member of the class consisting of hydrogen, the alkali metals, stoichiometric equivalents of alkaline-earth metals, ammonium, the alkylamines, alkanolamines, and polymethylenediamines.

The compositions of this invention are prepared by the following method:

A quantity of a thienyl ketone having the following formula:

(2) 

is dissolved in a suitable organic solvent, such as ethyl alcohol, and to the solution is added about 1½ molecular equivalents of an alkali cyanide and about 3 molecular equivalents of ammonium carbonate dissolved in water. The mixture is placed in a pressure apparatus, such as an autoclave, and heated for a period of from 6 to 24 hours at a temperature of between 90° and 150° C. and preferably at 110° C. The mixture is then cooled, and about 1½ molecular equivalents of an alkali cyanide and about 1 molecular equivalent of ammonium carbonate are added. The mixture is then heated under pressure at approximately 110° C. for an additional 6 to 24 hours. The mixture is removed from the pressure apparatus and about half of the liquid evaporated. The mixture separates into two layers, an oily and a water-soluble layer, in which any unreacted ketone is contained in the oily layer. The mixture is acidified with a mineral acid, such as concentrated hydrochloric acid, and extracted twice with portions of an organic solvent, such as ether or benzene. The combined organic solvent extract is agitate with at least two portions of a dilute water solution of an alkali hydroxide and the alkali hydroxide solution is then acidified with a mineral acid, such as hydrochloric acid, and heated to expel the organic solvent. The 5-R-5-(2-thienyl) hydantoin separates and is purified by any suitable means, such as recrystallization.

Desirably, R does not contain more than 9 carbon atoms. It may be, for example, the methyl, ethyl, n-butyl, isobutyl, n-amyl, isoamyl, 2-ethyl-butyl, secondary amyl, n-hexyl, phenyl, benzyl, phenylethyl, tolyl, xylyl, cyclobutyl, cyclopentyl, or cyclohexyl groups. Preferably, the sodium salt of the 5-R-5-(2-thienyl) hydantoin is used although other salts, such as the potassium, ammonium, lithium, calcium, magnesium, strontium, ethanolamine, and ethylenediamine salts may also be used.

The salts of the 5-R-5-(2-thienyl) hydantoin are prepared by reacting stoichiometric proportions of the 5-R-5-(2-thienyl) hydantoin and an alkoxide of the required metal, ammonium or substituted ammonium. For example, the sodium salt is prepared by reacting equal molecular proportions of sodium ethoxide and the 5-R-5-(2-thienyl) hydantoin. The 5-R-5-(2-thienyl) hydantoin is dissolved in ethanol or other suitable solvent and the sodium ethoxide is added to that solution. Alternately the sodium salt may be prepared by dissolving the 5-R-5-(2-thienyl) hydantoin in methanol or ethanol and sodium methoxide added to the solution. If a substituted ammonium salt is desired, a quantity of the 5-R-5-(2-thienyl) hydantoin dissolved in a suitable solvent, such as ethanol, is reacted with an equal molecular quantity of the substituted ammonium base, such as ethanolamine or ethylenediamine. The reaction is substantially immediate. To obtain the dry salt, the solution in any case is evaporated and the evaporation completed under vacuum.

Typical examples of the compositions of this invention are as follows:

Example 1—Preparation of 5-methyl-5-(2-thienyl) hydantoin

Three and seventy-nine hundredths grams (0.03 mol) of methyl-(2-thienyl) ketone dissolved in 75 cc. of ethanol is added to a solution of 3.25 g. (0.045 mol) of 90 percent potassium cyanide and 10.2 g. (0.09 mol) of ammonium carbonate in 75 cc. of water. The solution is placed in a small autoclave and heated for 19 hours at a temperature of about 110° C. There is then added 3.25 g. of potassium cyanide and 3 g. of ammonium carbonate. Heating is continued in the autoclave for an additional 18 hours at the same temperature. During these heatings of the reaction mixture, the 5-methyl-5-(2-thienyl) hydantoin is formed. The reaction mixture is removed and about half of the liquid evaporated, an oil separating during the process. The mixture is acidified with concentrated hydrochloric acid and extracted with two 100 cc. portions of ether. The extracts, which contain the 5-methyl-5-(2-thienyl) hydantoin, are combined and the combined ether extracts are shaken with two 25 cc. portions of five percent potassium hydroxide solution. The alkaline solution, which dissolves the 5-methyl-5-(2-thienyl) hydantoin to form the potassium salt thereof, is acidified with hydrochloric acid and heated to expel ether. An oil, which is the 5-methyl-5-(2-thienyl) hydantoin, separates and on cooling solidifies. The yield of the 5-methyl-5-(2-thienyl) hydantoin is approximately 62 percent of the theoretical. After several recrystallizations from dilute alcohol the compound melts at 138.5°–140° C. (corrected). Analysis reveals 14.49 percent nitrogen compared with a theoretical value of 14.32 percent nitrogen.

Example 2—Preparation of 5-ethyl-5-(2-thienyl) hydantoin

Four and twenty-five hundredths grams (0.03 mol) of ethyl-(2-thienyl) ketone, 2.8 g. (0.039 mol) of potassium cyanide, and 11.0 g. (0.097 mol) of ammonium carbonate in 100 cc. of 50 percent ethanol are placed in an autoclave in accordance with the procedure outlined in Example 1 and heated for 21 hours at about 110° C. The reaction mixture is evaporated to one half of its original volume, acidified, extracted with ether and the ether solution extracted with potassium hydroxide solution as outlined in Example 1. The yield of the crude compound, which comprises 5-ethyl-5-(2-thienyl) hydantoin, is about 76 percent of the theoretical. The purified compound melts at 177°–177.6° C. (corrected). Analysis reveals 13.39 percent nitrogen compared with a theoretical value of 13.33 percent nitrogen.

Example 3—Preparation of 5-n-propyl-5-(2-thienyl) hydantoin

A mixture of 4.6 g. (0.03 mol) of n-propyl-(2-thienyl) ketone, 3.25 g. (0.045 mol) of potassium cyanide, and 10.2 g. (0.09 mol) of ammonium carbonate in 150 cc. of 50 percent ethanol is heated in an autoclave for 10 hours at a temperature of 95° C. There is then added 2.17 g. (0.03 mol) of potassium cyanide and 3 g. of ammonium carbonate and the mixture is heated in an autoclave for 20 hours at 95° C. The 5-n-propyl-5-(2-thienyl) hydantoin is purified as described in Example 1. The yield of the crude 5-n-propyl-5-(2-thienyl) hydantoin is about 86 percent and the melting point of the purified product is about 178.3°–179° C. (corrected). Analysis reveals 12.28 percent nitrogen compared with a theoretical value of 12.49 percent nitrogen.

Example 4—Preparation of 5-n-butyl-5-(2-thienyl) hydantoin

This preparation is conducted in a manner similar to that described in Example 1. The following proportions are used: n-butyl-(2-thienyl) ketone, 5.05 g. (0.03 mol); potassium cyanide, 3.25 g. (0.045 mol); ammonium carbonate, 10.2 g. (0.09 mol) in 100 cc. of 50 percent ethanol. The time of the first heating is 18 hours at 110° C. Three and twenty-five hundredths grams of potassium cyanide and 3 g. of ammonium carbonate are added and the heating continued for an additional 18 hours at 110° C. The yield of crude 5-n-butyl-5-(2-thienyl) hydantoin is about 88 percent and the melting point of the purified material is 230°–231° C. (corrected). Analysis reveals 11.91 percent nitrogen compared with a theoretical value of 11.76 percent nitrogen.

Example 5—Preparation of 5-n-amyl-5-(2-thienyl) hydantoin

The preparation of 5-n-amyl-5-(2-thienyl) hydantoin is conducted in a manner similar to that described in Example 1. The following proportions are used: n-amyl-(2-thienyl) ketone, 5.46 g. (0.03 mol); potassium cyanide, 3.25 g. (0.45 mol); ammonium carbonate, 10.2 g. (0.09 mol) in 100 cc. of 50 percent ethanol. The initial period of heating is 24 hours at 110° C. Three and twenty-five hundredths grams of potassium cyanide and 3 g. of ammonium carbonate are added and the mixture heated for 22 hours at 110° C. The yield of crude 5-n-amyl-5-(2-thienyl) hydantoin obtained is about 82 percent and the melting point of the purified material is 154°–154.7° C. (corrected). Analysis reveals 10.97 percent nitrogen compared with a theoretical value of 11.11 percent nitrogen.

Example 6—Preparation of 5-phenyl-5-(2-thienyl) hydantoin

The 5-phenyl-5-(2-thienyl) hydantoin is prepared by heating a mixture of 5.64 g. (0.03 mol) of phenyl-(2-thienyl) ketone, 3.25 g. (0.03 mol) of potassium cyanide and 10.2 g. (0.09 mol) of ammonium carbonate in 75 cc. of 50 percent ethanol for 28 hours at a temperature of about 110° C. An additional 3.25 g. of potassium cyanide and 3 g. of ammonium carbonate are added and the mixture heated for 24 hours at about 110° C. By the process of purification described in Example 1, 4.3 g. of 5-phenyl-5-(2-thienyl) hydantoin is obtained, and from the ether layer, 2.2 g. of unreacted ketone. The yield of the 5-phenyl-5-(2-thienyl) hydantoin is about 56 percent. The melting point of the purified 5-phenyl-5-(2-thienyl) hydantoin is about 256°–257° C. (corrected). Analysis reveals 10.78 percent nitrogen compared with a theoretical value of 10.85 percent nitrogen.

Example 7—Preparation of 5-(1-ethylpropyl)-5-(2-thienyl) hydantoin

The 5-(1-ethylpropyl)-5-(2-thienyl) hydantoin is prepared in the same manner as the 5-methyl-5-(2-thienyl) hydantoin described in Example 1 except that the following materials and quantities are employed: 1-ethylpropyl-(2-thienyl) ketone, 5.4 g. (.03 mol); potassium cyanide, 3.25 g. (0.45 mol); ammonium carbonate, 10.2 g. (.09 mol) in 100 cc. of 50 percent ethanol. The time and temperature of heating is the same as that described in Example 1. After the reaction mixture has been heated for 19 hours at 110° C., as described in Example 1, there is added 3.25 g. of potassium cyanide and 3 g. of ammonium carbonate and the heating is continued in an autoclave for an additional 18 hours. During these heatings of the reaction mixture the 5-(1-ethylpropyl)-5-(2-thienyl)hydantoin is formed. The yield of the crude 5-(1-ethylpropyl)-5-(2-thienyl)hydantoin is about 13 per cent of the theoretical and the melting point of the purified material is about 208°–208.5° C. (corrected).

*Example 8—Preparation of 5-isobutyl-5-(2-thienyl)hydantoin*

The 5-isobutyl-5-(2-thienyl)hydantoin is prepared in the same manner as the 5-methyl-5-(2-thienyl)hydantoin described in Example 1 except that 5.04 g. of isobutyl-(2-thienyl) ketone is used instead of the methyl-(2-thienyl) ketone employed in Example 1. The yield of the crude 5-isobutyl-5-(2-thienyl)hydantoin is about 71 percent of the theoretical and the melting point of the purified product is about 155°–156.5° C. (corrected).

*Example 9—Preparation of 5-cyclohexyl-5-(2-thienyl)hydantoin*

Three and twenty-five hundredths grams of potassium cyanide is dissolved in 250 cc. of propylene glycol. To the solution is added 10.2 g. of ammonium carbonate and 5.82 g. of cyclohexyl-(2-thienyl) ketone in an autoclave. The material is heated for 18 hours at 110° C. An additional 3.25 g. of potassium cyanide and 3 g. of ammonium carbonate are then added and the heating continued for an additional 18 hours at 110° C. The cooled reaction mixture is diluted with 5 volumes of water and acidified with concentrated hydrochloric acid. The crude 5-cyclohexyl-5-(2-thienyl)hydantoin is recrystallized from alcohol. The yield of the crude 5-cyclohexyl-5-(2-thienyl)hydantoin is about 71 percent and the purified 5-cyclohexyl-5-(2-thienyl)-hydantoin melts at about 244°–245° C. (corrected).

*Example 10—Preparation of 5-(β-phenylethyl)-5-(2-thienyl)hydantoin*

The 5-(β-phenylethyl)-5-(2-thienyl)hydantoin is prepared in the same manner as the 5-methyl-5-(2-thienyl)hydantoin described in Example 1 except that 6.48 g. of β-phenylethyl-(2-thienyl) ketone is employed instead of the methyl-(2-thienyl) ketone employed in Example 1. The yield of the crude 5-(β-phenylethyl)-5-(2-thienyl)-hydantoin is about 52 percent of the theoretical and the melting point of the purified 5-(β-phenylethyl)-5-(2-thienyl)hydantoin is about 183°–184° C. (corrected).

*Example 11—Preparation of 5-o-tolyl-5-(2-thienyl)hydantoin*

The 5-o-tolyl-5-(2-thienyl)hydantoin is prepared in a manner similar to that described in Example 9 for the preparation of 5-cyclohexyl-5-(2-thienyl)hydantoin except that 6.06 g. of o-tolyl-(2-thienyl) ketone is used instead of the cyclohexyl-(2-thienyl) ketone employed in Example 9 and 200 g. of acetamide is used instead of the propylene glycol employed in Example 9.

*Example 12—Preparation of the sodium salt of 5-phenyl-5-(2-thienyl)hydantoin*

To a solution of 11.33 g. of 5-phenyl-5-(2-thienyl)hydantoin in 250 cc. of absolute ethanol is added a solution of sodium ethoxide prepared by adding 1.01 g. of sodium to 20 cc. of absolute ethanol. The reaction mixture is then evaporated to dryness in vacuo. To insure the removal of traces of alcohol the residue is heated under vacuum on a steam bath. The residue is the sodium salt of 5-phenyl-5-(2-thienyl)hydantoin. Other alkali metal salts, such as the potassium and lithium salts of 5-phenyl-5-(2-thienyl)-hydantoin are prepared in a similar manner except that potassium ethoxide or lithium ethoxide is employed instead of the sodium ethoxide.

*Example 13—Preparation of the calcium salt of 5-isobutyl-5-(2-thienyl)hydantoin*

To a solution of 3.57 g. of 5-isobutyl-5-(2-thienyl)hydantoin in 100 cc. of absolute ethanol is added a solution of calcium ethoxide prepared by dissolving 1.2 g. of calcium in 100 cc. of absolute ethanol. The reaction mixture is then evaporated to dryness in vacuo. To insure the removal of traces of alcohol the residue is heated under vacuum on a steam bath. The residue is the calcium salt of 5-isobutyl-5-(2-thienyl)hydantoin. Other alkaline-earth metal salts, such as the barium, strontium, and magnesium salts of 5-isobutyl-5-(2-thienyl)hydantoin are prepared in a similar manner except that barium, strontium, or magnesium alkoxides are employed instead of calcium ethoxide.

*Example 14—Preparation of ethanolamine salt of 5-n-amyl-5-(2-thienyl)hydantoin*

To a solution of 7.56 g. of 5-n-amyl-5-(2-thienyl)hydantoin in 100 cc. of absolute ethanol is added a solution of 1.83 g. of ethanolamine in 10 cc. of absolute ethanol. The reaction mixture is then evaporated to dryness in vacuo. To insure the removal of traces of alcohol, the residue is heated under vacuum on a steam bath. The residue is the ethanolamine salt of 5-n-amyl-5-(2-thienyl)hydantoin. Other alkanolamine salts, such as the propanolamine salt of 5-n-amyl-5-(2-thienyl)hydantoin are prepared in a similar manner except that the appropriate alkanolamine is employed instead of ethanolamine.

*Example 15—Preparation of the mono-5-cyclohexyl-5-(2-thienyl)hydantoin salt of ethylenediamine*

To a solution of 5.28 g. of 5-cyclohexyl-5-(2-thienyl)hydantoin in 150 cc. of absolute ethanol is added a solution of 1.2 g. of ethylenediamine in 25 cc. of absolute ethanol. The reaction mixture is then evaporated to dryness in vacuo. To insure the removal of traces of alcohol, the residue is heated under vacuum on a steam bath. The residue is the mono-5-cyclohexyl-5-(2-thienyl)hydantoin salt of ethylenediamine.

If the di-5-cyclohexyl-5-(2-thienyl)hydantoin salt of ethylenediamine is desired, 0.6 g. of ethylenediamine is reacted with the solution containing 5.28 g. of the 5-cyclohexyl-5-(2-thienyl)-hydantoin.

Other alkylenediamine salts of the 5-cyclohexyl-5-(2-thienyl)hydantoin may be prepared in similar manner by employing equivalent quantities of the required alkylenediamines instead of the ethylenediamine.

What is claimed is:

1. A 5-substituted-5-(2-thienyl)hydantoin which is represented by the following formula:

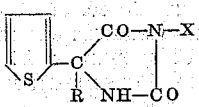

in which R represents a hydrocarbon radical and X represents a member of the class consisting of hydrogen, the alkali metals, stoichiometric equivalents of alkaline-earth metals, ammonium, alkylamines, alkanolamines, and polymethylene diamines.

2. A 5-substituted-5-(2-thienyl)hydantoin which is represented by the following formula:

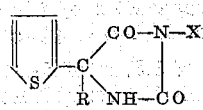

in which R represents a saturated alkyl radical having less than 9 carbon atoms and X represents a member of the class consisting of hydrogen, the alkali metals, stoichiometric equivalents of alkaline-earth metals, ammonium, alkylamines, alkanolamines, and polymethylene diamines.

3. A 5-substituted-5-(2-thienyl)hydantoin which is represented by the following formula:

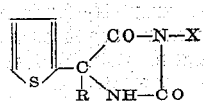

in which R represents a saturated branch chain alkyl radical having less than 9 carbon atoms and X represents a member of the class consisting of hydrogen, the alkali metals, stoichiometric equivalents of alkaline-earth metals, ammonium, alkylamines, alkanolamines, and polymethylene diamines.

4. A 5-substituted-5-(2-thienyl)hydantoin which is represented by the following formula:

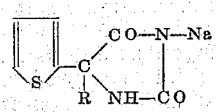

in which R is a hydrocarbon radical.

5. A 5-substituted-5-(2-thienyl)hydantoin which is represented by the following formula:

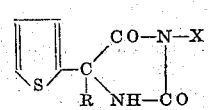

in which R is an acyclic hydrocarbon radical and X represents a member of the class consisting of hydrogen, the alkali metals, stoichiometric equivalents of alkaline-earth metals, ammonium, alkylamines, alkanolamines, and polymethylene diamines.

6. A 5-substituted-5-(2-thienyl)hydantoin which is represented by the following formula:

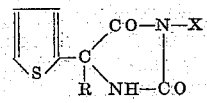

in which R is a cyclic hydrocarbon radical and X represents a member of the class consisting of hydrogen, the alkali metals, stoichiometric equivalents of alkaline-earth metals, ammonium, alkylamines, alkanolamines, and polymethylene diamines.

7. A 5-substituted-5-(2-thienyl)hydantoin which is represented by the following formula:

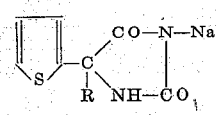

in which R is a straight chain alkyl group having less than 9 carbon atoms.

8. A 5-substituted-5-(2-thienyl)hydantoin which is represented by the following formula:

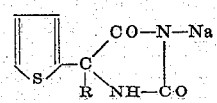

in which R is a branch chain alkyl group having less than 9 carbon atoms.

9. A 5-phenyl-5(2-thienyl)hydantoin which is represented by the following formula:

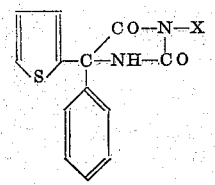

in which X represents a member of the class consisting of hydrogen, the alkali metals, stoichiometric equivalents of alkaline-earth metals, ammonium, alkylamines, alkanolamines, and polymethylene diamines.

10. The sodium salt of 5-methyl-5(2-thienyl)-hydantoin.

JAMES J. SPURLOCK.